(12) United States Patent
Mahood et al.

(10) Patent No.: US 9,718,918 B2
(45) Date of Patent: Aug. 1, 2017

(54) PROCESS TO PREPARE HIGH HEAT POLYCARBONATES

(71) Applicant: SABIC Global Technologies B.V., Bergen op Zoom (NL)

(72) Inventors: James Alan Mahood, Evansville, IN (US); Pankaj Singh Gautam, Evansville, IN (US)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 0 days.

(21) Appl. No.: 15/025,504

(22) PCT Filed: Sep. 30, 2014

(86) PCT No.: PCT/US2014/058296
§ 371 (c)(1),
(2) Date: Mar. 28, 2016

(87) PCT Pub. No.: WO2015/048735
PCT Pub. Date: Apr. 2, 2015

(65) Prior Publication Data
US 2016/0237210 A1    Aug. 18, 2016

Related U.S. Application Data

(60) Provisional application No. 61/884,425, filed on Sep. 30, 2013.

(51) Int. Cl.
*C08G 64/00* (2006.01)
*C08G 64/24* (2006.01)
*C08G 64/12* (2006.01)
*C08G 63/02* (2006.01)

(52) U.S. Cl.
CPC .............. *C08G 64/24* (2013.01); *C08G 64/12* (2013.01)

(58) Field of Classification Search
CPC ...................................................... C08G 79/00
USPC ........................................ 528/196, 198, 208
See application file for complete search history.

(56) References Cited

U.S. PATENT DOCUMENTS

| | | |
|---|---|---|
| 5,344,910 A | 9/1994 | Sybert |
| 7,122,613 B1 | 10/2006 | Peemans et al. |
| 7,135,577 B2 | 11/2006 | Rai et al. |
| 7,277,230 B2 | 10/2007 | Srinivasan et al. |
| 7,354,986 B2 | 4/2008 | Mahood et al. |
| 7,408,016 B2 | 8/2008 | Chatterjee et al. |
| 7,709,592 B2 | 5/2010 | Mahood |
| 7,790,832 B2 | 9/2010 | Ganesan et al. |
| 2011/0071261 A1 | 3/2011 | Hoeks et al. |

FOREIGN PATENT DOCUMENTS

EP    0617070 A2    9/1994

OTHER PUBLICATIONS

International Search Report for International Application No. PCT/US2014/058296; International Filing Date: Sep. 30, 2014; Date of Mailing: Dec. 15, 2014; 4 pages.
Written Opinion of the International Searching Authority for International Application No. PCT/US2014/058296; International Filing Date: Sep. 30, 2014; Date of Mailing: Dec. 15, 2014; 5 pages.

*Primary Examiner* — Terressa Boykin
(74) *Attorney, Agent, or Firm* — Cantor Colburn LLP

(57) ABSTRACT

A catalyzed interfacial phosgenation process with controlled feed ratios and controlled reaction pH levels allows for the formation of high heat polycarbonate random copolymers having high loadings of bis (4-hydroxyphenyl)-2-phenylisoindolin-1-one ("PPPBP") or a structurally related comonomer. The process produces a polycarbonate copolymer having improved hydrolytic stability.

20 Claims, No Drawings

PROCESS TO PREPARE HIGH HEAT POLYCARBONATES

CROSS REFERENCE TO RELATED APPLICATIONS

This application is a 371 of International Application No. PCT/US2014/058296, filed Sep. 30, 2014, which claims the benefit of U.S. Provisional Application No. 61/884,425, filed Sep. 30, 2013, both of which are incorporated by reference in their entirety herein.

BACKGROUND OF THE INVENTION

This disclosure relates to a process to prepare high heat polycarbonate compositions, and in particular a process to prepare high heat polycarbonate copolymer compositions.

Polycarbonates are widely used thermoplastic polymers owing to their superior impact resistance, transparence and good resistance to thermal deformation at elevated temperatures. Most commercial polycarbonate is the homopolycarbonate of bisphenol A ("BPA") and has a glass transition temperature in the range of 135 to 155° C. So-called high heat polycarbonates include copolymers of BPA with 3,3-bis(4-hydroxyphenyl)-2-phenylisoindolin-1-one ("PPPBP") which have glass transition temperatures above the homopolycarbonate of BPA.

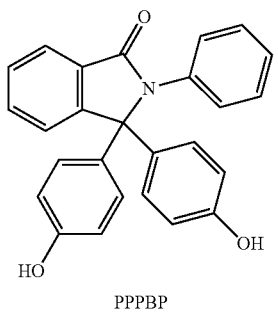

PPPBP

To improve the glass transition temperature of a polycarbonate, blends of BPA polycarbonate with copolymers containing units derived from PPPBP can be made. Thus, there is a desire to prepare copolymers with relatively high levels of PPPBP units, as these materials provide the most flexibility for blending with BPA polycarbonate to produce intermediate compositions.

Several synthetic routes have been reported for the synthesis of random PPPBP/BPA copolymers, but no single process works best for all compositions. PPPBP/BPA copolymers are less hydrolytically stable than BPA polycarbonate, and the hydrolytic instability increases with increasing PPPBP loading. Copolymers with compositions above 70 mole % PPPBP are particularly unstable.

Melt polymerization routes to PPPBP/BPA copolymers based on diphenyl carbonate ("DPC") require long residence times at high temperatures and can lead to higher color. These polymerizations become even more difficult as the PPPBP loading increases. Melt polymerizations of PPPBP/BPA copolycarbonates using DPC as the carbonate source are particularly unfavorable when the PPPBP content exceeds 30 mole %, as the required reaction temperatures can approach the decomposition temperature of the product polymers.

Melt polymerization using bis(methyl salicylate)carbonate ("BMSC") as the carbonate source reduces the residence time required at high temperatures and allow production of copolymers with >30 mole % PPPBP, but BMSC is not available at large scale and is not a viable commercial option. High color in the resulting polymer also remains an issue.

Interfacial polycarbonate polymerizations are low temperature processes and are particularly advantageous for the synthesis of high temperature polycarbonates. Interfacial polymerizations of PPPBP/BPA copolymers produce lower color polymer and are the commercially preferred route to PPPBP/BPA copolymers, but even interfacial polymerizations of PPPBP/BPA copolymers can suffer from processing issues. Standard interfacial polycarbonate manufacturing processes use centrifuge trains to separate aqueous impurities from the organic polymer stream. Interfacial polymerization of PPPBP/BPA copolymers can result in polymer solutions that separate poorly from the aqueous streams. Mixing of these organic and aqueous streams under shear can lead to emulsification (known as "creaming"), which results in yield loss and lower purity polymer. The presence of residual impurities in the polymer can result in reduced hydrolytic stability.

A known interfacial bischloroformate route to random PPPBP/BPA copolymer was found to be most effective at relatively low (<30 mole %) PPPBP loadings. Bischloroformate routes to PPPBP copolymers are not preferred for large scale manufacturing as they are less robust, more expensive, and less efficient from an economic standpoint because they often result in low throughput rates. Bischloroformate routes are highly sensitive to ppm levels of residual catalysts belonging to the family of alkylamines, and can result in high polydispersity especially at high pH.

Interfacial routes to PPPBP/BPA copolycarbonate have been reported based on the use of phosgene as the carbonate source and an amine-catalyzed ammonium salt phase-transfer catalyzed interfacial process. These routes produced random PPPBP/BPA copolymer, but suffer from various amounts of centrifuge creaming and suboptimal hydrolytic stability of the resulting polymer.

There accordingly remains a need in the art for a robust, efficient, and cost effective process for the production of random PPPBP/BPA copolymers with high loading of PPPBP, e.g. about 30 to about 70 mole % PPPBP having low creaming and resulting in polymers having improved hydrolytic stability.

SUMMARY OF THE INVENTION

The above-described and other deficiencies of the art are met by a method for preparing polycarbonate copolymer by an interfacial method comprising phosgenating a mixture comprising an aromatic dihydroxy compound, water, an organic solvent substantially immiscible with water, and a condensation catalyst to form a reaction mixture; cofeeding an aqueous high heat comonomer feed to the reaction mixture during the phosgenation step at a ratio of about 1.75 to about 9 high heat comonomer/phosgene weight/weight dry basis; and maintaining the pH of the reaction mixture during the phosgenation step at about 7 to about 11, to form a polycarbonate copolymer comprising greater than about 30 mole % structural units derived from the high heat comonomer.

The above described and other features are exemplified by the following detailed description.

DETAILED DESCRIPTION OF THE INVENTION

This disclosure describes a method to prepare a family of high heat polycarbonates using a catalyzed interfacial phosgenation process. Using the method, a family of high heat polycarbonates can be synthesized in an advantageous fashion having a glass transition temperature in the range of about 180 to about 250° C., improved hydrolytic stability, good resistance to heat aging and excellent metallizability compared with other high heat polycarbonates. The process can be used to conveniently prepare high heat polycarbonate random copolymers of BPA and greater than about 30 mole % (m %) 3,3-bis(4-hydroxyphenyl)-2-phenylisoindolin-1-one ("PPPBP") or a structurally related monomer (hereinafter "high heat comonomer"), for example about 30 to about 70 m % PPPBP or a structurally related monomer. By controlling the feed ratios of the high heat comonomer and phosgene as well as the pH during the phosgenation reaction, high loadings of high heat comonomer can be achieved without the problems associated with prior methods. Additionally, on large scale, the absence of a phase transfer catalyst results in low creaming.

The method for preparing polycarbonate random copolymer by an interfacial method comprises phosgenating a mixture comprising an aromatic dihydroxy compound, water, an organic solvent substantially immiscible with water, and a condensation catalyst to form a reaction mixture; cofeeding an aqueous high heat comonomer feed (solution, slurry, or a combination comprising at least one of the foregoing) to the reaction mixture during the phosgenation step at a ratio of about 1.75 to about 9 high heat comonomer/phosgene weight/weight dry basis; and maintaining the pH of the reaction mixture during the phosgenation step at about 7 to about 11, to form a polycarbonate copolymer comprising greater than 30 mole % structural units derived from the high heat comonomer. As used herein, the term "structural units derived from" when used in the context of describing the portions of the copolycarbonates derived from the high heat comonomer and the aromatic dihydroxy compounds refers to the fact that both such monomers lose their respective hydrogen atoms upon incorporation in the polymer.

The phosgenation step is performed using phosgene, diphosgene, or triphosgene. In an embodiment, the phosgenation step is performed using phosgene.

The high heat comonomer can be a 2-aryl-3,3-bis(4-hydroxyaryl)phthalimide or a structurally related high heat comonomer. An exemplary class of 2-aryl-3,3-bis(4-hydroxyaryl)phthalimide is according to Formula (1a) and structurally related high heat comonomers include those according to Formula (1b):

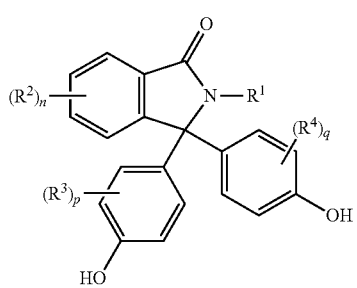

(1a)

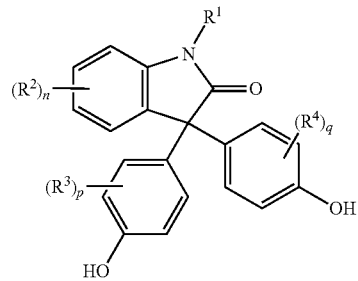

(1b)

wherein $R^1$ is $C_{1-12}$ alkyl, $C_{6-12}$ aryl optionally substituted with 1 to 5 $C_{1-10}$ alkyl groups, or benzyl optionally substituted with 1 to 5 $C_{1-10}$ alkyl groups; $R^2$ is a $C_{1-12}$ hydrocarbyl group or a halogen; $R^3$ and $R^4$ are each independently a halogen, $C_{1-12}$ alkoxy, or $C_{1-12}$ alkyl; n is 0 to 2; and p and q are each independently 0 to 4. In an embodiment, the high heat comonomer is of Formula (1a) where $R^2$ is $C_{1-6}$ alkyl, n is 0 or 1, p is 0, q is 0, and $R^1$ is phenyl.

Other high heat comonomers include those of Formula (1b) particularly where $R^3$ and $R^4$ are each methyl, p and q are each independently 0 or 1, n is 0, and $R^2$ is $C_{1-4}$ alkyl or phenyl.

Examples of high heat comonomers are 3,3-bis(4-hydroxyphenyl)phthalimidine and 2-phenyl-3,3-bis(4-hydroxyphenyl)phthalimidine (also called 3,3-bis(4-hydroxyphenyl)-2-phenylisoindolin-1-one or PPPBP).

In an embodiment, the high heat comonomer is PPPBP.

The aromatic dihydroxy compound is not the same as the high heat comonomer, and can be a compound of the formula HO—$R^5$—OH, in particular of Formula (2)

$$HO\text{-}A^1\text{-}Y^1\text{-}A^2\text{-}OH \quad (2)$$

wherein each of $A^1$ and $A^2$ is a monocyclic divalent aromatic group and $Y^1$ is a single bond or a bridging group having one or more atoms that separate $A^1$ from $A^2$. In an embodiment, one atom separates $A^1$ from $A^2$. For example, each $R^5$ can be derived from a bisphenol of Formula (3)

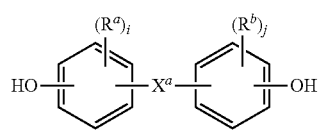

(3)

wherein $R^a$ and $R^b$ are each independently a halogen, $C_{1-12}$ alkoxy, or $C_{1-12}$ alkyl; and i and j are each independently integers of 0 to 4. It will be understood that when i or j is less than 4, the valence of each carbon of the ring is filled by hydrogen. Also in Formula (3), $X^a$ is a bridging group connecting the two hydroxy-substituted aromatic groups, where the bridging group and the hydroxy substituent of each $C_6$ arylene group are disposed ortho, meta, or para to each other on the $C_6$ arylene group. In an embodiment, the bridging group $X^a$ is single bond, —O—, —S—, —S(O)—, —S(O)$_2$—, —C(O)—, or a $C_{1-18}$ organic group. The $C_{1-18}$ organic bridging group can be cyclic or acyclic, aromatic or non-aromatic, and can further comprise heteroatoms such as halogens, oxygen, nitrogen, sulfur, silicon, or phosphorous. The $C_{1-18}$ organic group can be disposed such that the $C_6$ arylene groups connected thereto are each connected to a common alkylidene carbon or to different carbons of the $C_{1-18}$ organic bridging group. In an embodiment, i and j is each 1, and $R^a$ and $R^b$ are each a $C_{1-3}$ alkyl group, (e.g. methyl), disposed meta to the hydroxy group on each arylene group.

In an embodiment, $X^a$ is a substituted or unsubstituted $C_{3-18}$ cycloalkylidene, a $C_{1-25}$ alkylidene of formula —C($R^c$)($R^d$)— wherein $R^c$ and $R^d$ are each independently hydrogen, $C_{1-12}$ alkyl, $C_{1-12}$ cycloalkyl, $C_{7-12}$ arylalkyl, $C_{1-12}$ heteroalkyl, or cyclic $C_{7-12}$ heteroarylalkyl, or a group of the formula —C(=$R^e$)— wherein $R^e$ is a divalent $C_{1-12}$ hydrocarbon group. Groups of this type include methylene, cyclohexylmethylene, ethylidene, neopentylidene, and isopropylidene, as well as 2-[2.2.1]-bicycloheptylidene, cyclohexylidene, cyclopentylidene, cyclododecylidene, and adamantylidene.

In another embodiment, $X^a$ is a $C_{1-18}$ alkylene, a $C_{3-18}$ cycloalkylene, a fused $C_{6-18}$ cycloalkylene, or a group of the formula —$B^1$-G-$B^2$— wherein $B^1$ and $B^2$ are the same or different $C_{1-6}$ alkylene and G is a $C_{3-12}$ cycloalkylidene or a $C_{6-16}$ arylene. For example, $X^a$ can be a substituted $C_{3-18}$ cycloalkylidene of Formula (4)

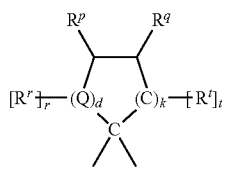

(4)

wherein $R^r$, $R^p$, $R^q$, and $R^t$ are each independently hydrogen, halogen, oxygen, or $C_{1-12}$ hydrocarbon groups; Q is a direct bond, a carbon, or a divalent oxygen, sulfur, or —N(Z)— where Z is hydrogen, halogen, hydroxy, $C_{1-12}$ alkyl, $C_{1-12}$ alkoxy, or $C_{1-12}$ acyl; r is 0 to 2, t is 1 or 2, d is 0 or 1, and k is 0 to 3, with the proviso that at least two of $R^r$, $R^p$, $R^q$, and $R^t$ taken together are a fused cycloaliphatic, aromatic, or heteroaromatic ring. It will be understood that where the fused ring is aromatic, the ring as shown in Formula (4) will have an unsaturated carbon-carbon linkage where the ring is fused. When k is one and d is 0, the ring as shown in Formula (4) contains 4 carbon atoms, when k is 2, the ring as shown in Formula (4) contains 5 carbon atoms, and when k is 3, the ring contains 6 carbon atoms. In an embodiment, two adjacent groups (e.g., $R^q$ and $R^t$ taken together) form an aromatic group, and in another embodiment, $R^q$ and $R^t$ taken together form one aromatic group and $R^r$ and $R^p$ taken together form a second aromatic group. When $R^q$ and $R^t$ taken together form an aromatic group, $R^p$ can be a double-bonded oxygen atom, i.e., a ketone.

Other aromatic dihydroxy compounds according to the formula HO—$R^3$—OH, include those of Formula (5)

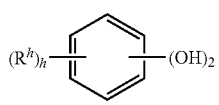

(5)

wherein each $R^h$ is independently a halogen atom, $C_{1-10}$ hydrocarbyl group such as a $C_{1-10}$ alkyl, a halogen-substituted $C_{1-10}$ alkyl, a $C_{6-10}$ aryl, or a halogen-substituted $C_{6-10}$ aryl, and h is 0 to 4. The halogen can be fluorine, chlorine, or bromine. In an embodiment, the halogen is bromine.

Some illustrative examples of dihydroxy compounds include the following: 4,4'-dihydroxybiphenyl, 1,6-dihydroxynaphthalene, 2,6-dihydroxynaphthalene, 1,1-bis(4-hydroxyphenyl)methane, 1,1-bis(4-hydroxyphenyl)ethane, 2,2-bis(4-hydroxyphenyl)butane, 2,2-bis(4-hydroxyphenyl) octane, 1,1-bis(4-hydroxyphenyl)propane, 1,1-bis(4-hydroxyphenyl) n-butane, 2,2-bis(4-hydroxy-2-methylphenyl) propane, 1,1-bis(4-hydroxy-3-t-butylphenyl)propane, and 1,1-bis(4-hydroxy-3-methylphenyl)cyclohexane (DMBPC), bis(4-hydroxyphenyl)diphenylmethane, bis(4-hydroxyphenyl)-1-naphthylmethane, 1,2-bis(4-hydroxyphenyl)ethane, 1,1-bis(4-hydroxyphenyl)-1-phenylethane, 2-(4-hydroxyphenyl)-2-(3-hydroxyphenyl)propane, bis(4-hydroxyphenyl)phenylmethane, 2,2-bis(4-hydroxy-3-bromophenyl)propane, 1,1-bis(hydroxyphenyl)cyclopentane, 1,1-bis(4-hydroxyphenyl)cyclohexane, 1,1-bis(4-hydroxyphenyl) isobutene, 1,1-bis(4-hydroxyphenyl)cyclododecane, trans-2, 3-bis(4-hydroxyphenyl)-2-butene, 2,2-bis(4-hydroxyphenyl)adamantane, alpha, alpha'-bis(4-hydroxyphenyl)toluene, bis(4-hydroxyphenyl)acetonitrile, 2,2-bis(3-methyl-4-hydroxyphenyl)propane, 2,2-bis(3-ethyl-4-hydroxyphenyl)propane, 2,2-bis(3-n-propyl-4-hydroxyphenyl)propane, 2,2-bis(3-isopropyl-4-hydroxyphenyl)propane, 2,2-bis(3-sec-butyl-4-hydroxyphenyl)propane, 2,2-bis(3-t-butyl-4-hydroxyphenyl)propane, 2,2-bis(3-cyclohexyl-4-hydroxyphenyl)propane, 2,2-bis(3-allyl-4-hydroxyphenyl)propane, 2,2-bis(3-methoxy-4-hydroxyphenyl)propane, 2,2-bis(4-hydroxyphenyl)hexafluoropropane, 1,1-dichloro-2,2-bis(4-hydroxyphenyl)ethylene, 1,1-dibromo-2,2-bis(4-hydroxyphenyl)ethylene, 1,1-dichloro-2,2-bis(5-phenoxy-4-hydroxyphenyl)ethylene, 4,4'-dihydroxybenzophenone, 3,3-bis(4-hydroxyphenyl)-2-butanone, 1,6-bis(4-hydroxyphenyl)-1,6-hexanedione, ethylene glycol bis (4-hydroxyphenyl)ether, bis(4-hydroxyphenyl)ether, bis(4-hydroxyphenyl)sulfide, bis(4-hydroxyphenyl)sulfoxide, bis (4-hydroxyphenyl)sulfone, 9,9-bis(4-hydroxyphenyl) fluorine, 2,7-dihydroxypyrene, 6,6'-dihydroxy-3,3,3',3'-tetramethylspiro(bis)indane ("spirobiindane bisphenol"), 2,6-dihydroxydibenzo-p-dioxin, 2,6-dihydroxythianthrene, 2,7-dihydroxyphenoxathin, 2,7-dihydroxy-9,10-dimethylphenazine, 3,6-dihydroxydibenzofuran, 3,6-dihydroxydibenzothiophene, and 2,7-dihydroxycarbazole, resorcinol, substituted resorcinol compounds such as 5-methyl resorcinol, 5-ethyl resorcinol, 5-propyl resorcinol, 5-butyl resorcinol, 5-t-butyl resorcinol, 5-phenyl resorcinol, 5-cumyl resorcinol, 2,4,5,6-tetrafluoro resorcinol, 2,4,5,6-tetrabromo resorcinol, or the like; catechol; hydroquinone; substituted hydroquinones such as 2-methyl hydroquinone, 2-ethyl hydroquinone, 2-propyl hydroquinone, 2-butyl hydroquinone, 2-t-butyl hydroquinone, 2-phenyl hydroquinone, 2-cumyl hydroquinone, 2,3,5,6-tetramethyl hydroquinone, 2,3,5,6-tetra-t-butyl hydroquinone, 2,3,5,6-tetrafluoro hydroquinone, 2,3,5,6-tetrabromo hydroquinone, or the like, or a combination comprising at least one of the foregoing compounds.

In an embodiment, the aromatic dihydroxy compound is 2,2-bis(4-hydroxyphenyl)propane (bisphenol A).

The condensation catalyst can be an acid acceptor such as an organic amine, for example an aliphatic tertiary amine, such as for example, a trialkylamine including triethylamine and tributylamine, a cycloaliphatic tertiary amine such as N,N-diethyl-cyclohexylamine, and an aromatic tertiary amine such as N,N-dimethylaniline. The condensation catalyst can be used in the range of about 0.5 to about 4 mol % of total monomer, for example about 1.0 to about 2.0 mol %. In an embodiment, the condensation catalyst is triethylamine.

The pH of the reaction mixture during the phosgenation step can be maintained using a caustic or base, for example an aqueous caustic or aqueous base solution. The caustic can be an alkali metal hydroxide, an alkaline earth hydroxide, or an alkaline earth oxide. In an embodiment, an aqueous sodium hydroxide solution is used to maintain the targeted pH.

The interfacial polymerization method can be carried in a batch, semibatch, or a continuous mode using one or more reactor systems. To carry out the process in a continuous mode, one or more continuous reactors, such as for example, a tubular reactor can be used in conjunction with a stirred tank to finish the condensation reaction.

The polycarbonate is manufactured by an interfacial polymerization process. The process generally involves preparing a slurry of an aromatic dihydroxy compounds in a two phase mixture of water and an organic solvent substantially immiscible with water in a reactor. The organic solvent substantially immiscible with water can be, for example, methylene chloride, 1,2-dichloroethane, chlorobenzene, toluene, and the like. An optional chelating agent can be added to the two phase mixture. Exemplary chelating agents include sodium gluconate, and the like. A condensation catalyst is then added to the reactor. The resulting reaction mixture is then phosgenated using a phosgene as a carbonate precursor, and a feed of a high heat comonomer (solution, slurry, or a combination comprising at least one of the foregoing) is fed to the reactor during phosgenation in a specified ratio to the phosgenation rate. The ratio of high heat comonomer/phosgene is about 1.75 to about 9 weight/weight dry basis, for example about 2 to about 6. During phosgenation, the reaction mixture pH is maintained at about 7 to about 11, for example about 8 to about 10 or about 8.5 to about 9.5. The pH can be adjusted using a caustic solution or basic solution as discussed above. The total phosgene added to the batch can be in the range of about 10% to about 50% excess, for example about 30% to about 40% excess compared to minimum amount needed to complete the reaction based on stoichiometry.

The feed of high heat comonomer used in the reaction process can be prepared by dissolving or suspending the high heat comonomer in a caustic solution and water to form a solution having a solids content, e.g. 25 wt % high heat comonomer or a slurry containing partially dissolved solids. In an embodiment, the caustic is added at an amount of 2.1 mol/mol high heat comonomer on a dry basis.

The quantity of solvent added to prepare the slurry of the aromatic dihydroxy compound in a two phase mixture of water and a water-immiscible solvent targets a 15 wt % solids in organic phase at the end of the reaction while the quantity of water added targets 16 wt % salts, NaCl and $Na_2CO_3$ included, in aqueous phase at the end of the reaction.

In an embodiment, the high heat comonomer feed charge is complete at 42% of the batch total phosgene setpoint. The "setpoint" is a preset value of a controlled variable in a process.

In an embodiment, the process is conducted in the absence of a phase transfer catalyst. In another embodiment, if a phase transfer catalyst is used, typically in a small batch to avoid creaming, it is used in combination with a condensation catalyst. Exemplary phase transfer catalysts that can be used are catalysts of the formula $(R^6)_4Z^+X$, wherein each $R^6$ is the same or different, and is a $C_{1-10}$ alkyl; Z is a nitrogen or phosphorus atom; and X is a halogen atom or a $C_{1-8}$ alkoxy or $C_{6-18}$ aryloxy. Exemplary phase transfer catalysts include $(CH_3(CH_2)_3)_4NX$, $(CH_3(CH_2)_3)_4PX$, $(CH_3(CH_2)_5)_4NX$, $(CH_3(CH_2)_6)_4NX$, $(CH_3(CH_2)_4)_4NX$, $CH_3(CH_3(CH_2)_3)_3NX$, and $CH_3(CH_3(CH_2)_2)_3NX$, wherein X is $Cl^-$, $Br^-$, a $C_{1-8}$ alkoxy or a $C_{6-18}$ aryloxy. An effective amount of a phase transfer catalyst can be 0.1 to 10 wt %, or 0.5 to 2 wt %, each based on the weight of monomer in the phosgenation mixture.

A chain stopper (also referred to as an end-capping agent or chain terminating agent) can be included during polymerization. The chain stopper limits molecular weight growth rate, and so controls molecular weight in the polycarbonate. Exemplary chain stoppers include certain mono-phenolic compounds, monocarboxylic acid chlorides, and/or mono-chloroformates. Mono-phenolic chain stoppers are exemplified by monocyclic phenols such as phenol and $C_1$-$C_{22}$ alkyl-substituted phenols such as p-cumyl-phenol, resorcinol monobenzoate, and p- and tertiary-butyl phenol; and monoethers of diphenols, such as p-methoxyphenol. Other examples include alkyl-substituted phenols with branched chain alkyl substituents having 8 to 9 carbon atom. Functionalized chlorides of aliphatic monocarboxylic acids, such as acryloyl chloride and methacryoyl chloride, are also useful. Also useful are mono-chloroformates including monocyclic, mono-chloroformates, such as phenyl chloroformate, alkyl-substituted phenyl chloroformate, p-cumyl phenyl chloroformate, toluene chloroformate, or a combination comprising at least one of the foregoing.

At the end of the reaction, the aqueous phase and the organic phase are separated, for example by centrifugation, wherein the organic phase comprises the polymer (e.g., comprises dissolved polymer, such as polymer dissolved in MeCl). It has been found that using the specified feed ratio and reaction pH, along with the absence of a phase transfer catalyst, minimum creaming occurs.

The polycarbonates prepared by the instant process can have a glass transition temperature of about 180 to about 250° C., for example about 200 to about 250° C.

The polycarbonates prepared by the instant process can have a weight average molecular weight ($M_W$) of about 10,000 to about 200,000 Daltons, for example about 12,000 to about 100,000 and about 15,000 to about 30,000 Daltons. As used herein the Mw is measured by gel permeation chromatography (GPC), using a crosslinked styrene-divinylbenzene column and calibrated to polycarbonate references. GPC samples are prepared at a concentration of 1 mg per ml, and are eluted at a flow rate of 1.5 ml per minute.

The polycarbonate copolymer prepared by the disclosed process can be formulated into a blend with at least one other thermoplastic polymer. The at least one other thermoplastic polymer is selected from vinyl polymers, acrylic polymers, polyacrylonitrile, polystyrenes, polyolefins, polyesters, polyurethanes, polyamides, polysulfones, polyimides, polyetherimides, polyphenylene ethers, polyphenylene sulfides, polyether ketones, polyether ether ketones, acrylonitrile-butadiene-styrene (ABS), acrylonitrile-styrene-acrylate (ASA), polyethersulfones, poly(alkenylaromatic) polymers, polybutadiene, polyacetals, polycarbonates, polyphenylene ethers, ethylene-vinyl acetate copolymers, polyvinyl acetate, liquid crystal polymers, ethylene-tetrafluoroethylene copolymer, aromatic polyesters, polyvinyl fluoride, polyvinylidene fluoride, polyvinylidene chloride, tetrafluoroethylene, polycarbonate-polyorganosiloxane block copolymers, copolymers comprising aromatic ester, estercarbonate, and carbonate repeat units; mixtures, and blends comprising at least one of the foregoing polymers.

The polycarbonates disclosed herein may also be combined with effective amounts of one or more of various types of additives used selected from fillers, fire retardants, drip retardants, antistatic agents, UV stabilizers, heat stabilizers, antioxidants, plasticizers, dyes, pigments, colorants, processing aids, and mixtures thereof. These additives are known in the art, as are their effective levels and methods of incorporation. Effective amounts of the additives vary widely, but they are usually present in an amount up to about 50% or more by weight, based on the weight of the entire composition.

The polymers and polymer blends described hereinabove are valuable for producing articles. Shaped, formed, or molded articles comprising the polycarbonate compositions are also provided. The polycarbonate compositions can be molded into useful shaped articles by a variety of means such as injection molding, extrusion, rotational molding, blow molding and thermoforming to form articles such as, for example, automotive headlamp inner lens, an automotive headlamp outer lens, an automotive fog lamp lens, an automotive bezel, a medical device, a display device (e.g. a laptop computer screen, a liquid crystal display screen, and an organic light-emitting diode display screen), electric
al connectors, under the hood automotive parts, and projector lens, and the like.

Embodiment 1

A method for preparing polycarbonate copolymer by an interfacial method, comprising phosgenating a mixture comprising an aromatic dihydroxy compound, water, an organic solvent substantially immiscible with water, and a condensation catalyst to form a reaction mixture; cofeeding an aqueous high heat comonomer feed to the reaction mixture during the phosgenation step at a ratio of about 1.75 to about 9 high heat comonomer/phosgene weight/weight dry basis; and maintaining the pH of the reaction mixture during the phosgenation step at greater than 7 to less than 11, to form a polycarbonate copolymer comprising greater than about 30 mole % structural units derived from the high heat comonomer.

Embodiment 2

The method of Embodiment 1, wherein the aqueous high heat comonomer feed is a slurry feed, a solution feed, or a combination comprising at least one of the foregoing feeds.

Embodiment 3

The method of any one of Embodiments 1-2, wherein the ratio of high heat comonomer/phosgene is about 1.75 to about 6 weight/weight dry basis.

Embodiment 4

The method of any one of Embodiments 1-3, wherein the ratio of high heat comonomer/phosgene is about 1.75 to about 4 weight/weight dry basis.

Embodiment 5

The method of any one of Embodiments 1-4, wherein the pH of the reaction mixture during the phosgenation step is maintained at about 8 to about 10.

Embodiment 6

The method of any one of Embodiments 1-5, wherein the pH of the reaction mixture during the phosgenation step is maintained at about 8.5 to about 9.5.

Embodiment 7

The method of any one of Embodiments 1-6, wherein the pH of the reaction mixture during the phosgenation step is maintained using a caustic.

Embodiment 8

The method of any one of Embodiments 1-6, wherein the pH of the reaction mixture during the phosgenation step is maintained using an alkali metal hydroxide, an alkaline earth hydroxide, or an alkaline earth oxide.

Embodiment 9

The method of any one of Embodiments 1-6, wherein the pH of the reaction mixture during the phosgenation step is maintained using aqueous sodium hydroxide.

Embodiment 10

The method of any one of Embodiments 1-9, wherein the aromatic dihydroxy compound is a compound according to Formula (3)

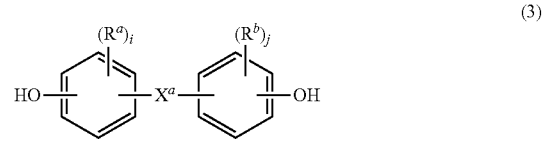

(3)

wherein $R^a$ and $R^b$ are each independently a halogen, $C_{1-12}$ alkoxy, or $C_{1-12}$ alkyl; i and j are each independently integers of 0 to 4; and $X^a$ is single bond, —O—, —S—, —S(O)—, —S(O)_2—, —C(O)—, or a $C_{1-18}$ organic group; or Formula (5)

(5)

wherein each $R^h$ is independently a halogen atom, a $C_{1-10}$ alkyl, a halogen-substituted $C_{1-10}$ alkyl, a $C_{6-10}$ aryl, or a halogen-substituted $C_{6-10}$ aryl; and h is 0 to 4.

Embodiment 11

The method of any one of Embodiments 1-10, wherein the aromatic dihydroxy compound is bisphenol A.

Embodiment 12

The method of any one of Embodiments 1-11, wherein the high heat comonomer is a compound according to Formula (1a), Formula (1b), or a combination comprising at least one of the foregoing:

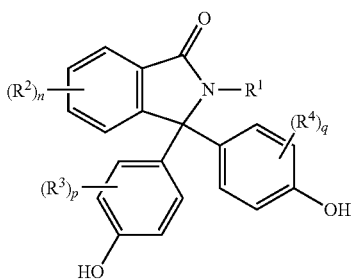

(1a)

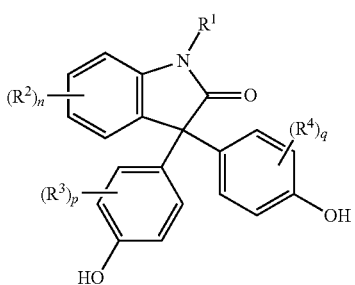

(1b)

wherein $R^1$ is $C_{1-12}$ alkyl, $C_{6-12}$ aryl optionally substituted with 1 to 5 $C_{1-10}$ alkyl groups, or benzyl optionally substituted with 1 to 5 $C_{1-10}$ alkyl groups; $R^2$ is a $C_{1-12}$ hydrocarbyl group or a halogen; $R^3$ and $R^4$ are each independently a halogen, $C_{1-12}$ alkoxy, or $C_{1-12}$ alkyl; n is 0 to 2; and p and q are each independently 0 to 4.

Embodiment 13

The method of any one of Embodiments 1-11, wherein the high heat comonomer is 3,3-bis(4-hydroxyphenyl)-2-phenylisoindolin-1-one ("PPPBP").

Embodiment 14

The method of any one of Embodiments 1-13, wherein the phosgenation is performed using phosgene.

Embodiment 15

The method of any one of Embodiments 1-14, wherein the condensation catalyst is an organic tertiary amine.

Embodiment 16

The method of any one of Embodiments 1-15, wherein the mixture further comprises a chelating agent.

Embodiment 17

The reaction of any one of Embodiments 1-16, performed in the absence of a phase transfer catalyst.

Embodiment 18

The method of any one of Embodiments 1-17, wherein the polycarbonate copolymer comprises about 30 to about 70 mole % structural units derived from the high heat comonomer.

Embodiment 19

The method of any one of Embodiments 1-18, wherein the polycarbonate copolymer is hydrolytically stable and has a glass transition temperature of about 180 to about 250° C.

Embodiment 20

The method of any one of Embodiments 1-19, wherein the polycarbonate copolymer retains greater than or equal to 90% of an initial Mw after 48 hours at 60° C. as determined using gel permeation chromatography.

Embodiment 21

The method of any one of Embodiments 1-20, wherein the polycarbonate copolymer has a low creaming on the centrifuges, wherein the creaming is less than 5% on each of the centrifuges, wherein the creaming percent is determined by the following formula:

$$\text{creaming}\% = \frac{\text{volume organic phase} + \text{volume emulsion}}{\text{volume aqueous phase} + \text{volume organic phase} + \text{volume emulsion}} * 100.$$

The process for preparing polycarbonate copolymer is further illustrated by the following non-limiting examples.

EXAMPLES

The following components are used in the examples.

| Acronym | Component |
|---------|-----------|
| BPA | Bisphenol A |
| NaOH | Sodium hydroxide |
| MEK | methyl ethyl ketone |
| MTBA | Methyl tri-n-butyl ammonium chloride |
| PPPBP | 3,3-bis(4-hydroxyphenyl)-2-phenylisoindolin-1-one |
| TEA | Triethyl amine |

Example 1. Process for Making 30-70 m % PPPBP/BPA Copolymer (pH=8-10)

A PPPBP/BPA copolymer was prepared using a co-feed process. PPPBP powder was dissolved in a 33 wt % caustic solution and demineralized water to form a solution that is 25 wt % PPPBP and the caustic added was 2.1 mol/mol PPPBP on a dry basis. In a separate formulation tank, BPA powder was slurried in a two phase mixture containing methylene chloride, water and sodium gluconate, 0.0008 pound/pound (lb/lb) polymer dry basis, added as chelating agent. The quantity of solvent added targets a 15 wt % solids in organic phase at the end of the reaction while the quantity of water added targets 16 wt % salts, NaCl and $Na_2CO_3$ included, in aqueous phase at the end of the reaction. The slurry was then transferred from the formulation tank to the reactor. Catalyst, e.g. TEA, was added to the reactor in the range of 0.5 to 2 mol % of total monomer—BPA and PPPBP. Phosgene gas and PPPBP solution were cofed to the reactor in a specified ratio. PPPBP solution charge was complete at 42% of the batch total phosgene setpoint. Caustic solution was added to the reaction mixture during phosgenation to maintain pH=8-10. The total phosgene added to the batch was in the range of 10% to 50% excess, for example 30% to 40% excess compared to minimum amount needed to complete the reaction based on stoichiometry.

Comparative Example 2 (Low pH, pH=5-7) and
Comparative Example 3 (High pH, pH=11-12.5)

Two comparative examples were run using the process conditions as in Example 1 above, except with a NaOH solution fed to maintain a different pH target as set out in Table 1 below.

TABLE 1

Co-feed route and impact of pH profile

| Example | pH profile | Polymer Mw | PDI | MW <1000, wt % | mol % PPP |
|---|---|---|---|---|---|
| 1 | 8-10 | 21856 | 2.14 | 0.70 | 31.7 |
| Comparative 2 | 5-7 | 23431 | 2.21 | 0.73 | 32.2 |
| Comparative 3 | 11-12.5 | 23990 | 2.52 | 1.12 | 31.9 |

*Example 1 results are average of 2 trial replicates while Comparative Example 2 and Comparative Example 3 results are an average of 3 trial replicates for each condition.

As shown in the results, the lowest polydispersity index ("PDI") is obtained when the reaction is carried out in the pH range of 8 to 10 (Example 1) as opposed to high pH range of 11 to 12.5 (Comparative Example 3). Not wishing to be bound by theory, it is hypothesized that the high pH results in a blocky copolymer that has lower hydrostability (see Table 5 below) compared with low or moderate pH conditions of polymerization.

Comparative Example 4 (Early Feed) and
Comparative Example 5 (Late Feed)

Two additional comparative examples were run using the process conditions as in Example 1 above, except varying the ratio in which the PPPBP solution is cofed with phosgene. The total phosgene charged to the batch is 42% excess to the stoichiometry assuming no side reactions. The pH profile for the trials in Example 1 is in the range of 8 to 10 and the endcap charged is the same for all the batches in Table 2. PPPBP/phosgene lb/lb data in Table 2 is on dry basis, i.e. ratio of dry PPPBP to dry phosgene fed to the reaction mixture. The polymer weight average molecular weight ("$M_W$") build up was explored in this comparison.

theory, it is hypothesized that when the PPPBP/phosgene ratio is low as in Comparative Example 5 a large amount of oligomers rich in PPPBP are formed that are essentially uncapped. To validate the hypothesis, the batch in the first trial of Comparative Example 5 (5-1) was rephosgenated by an extra 10% of original phosgene setpoint and molecular weight was checked again. The $M_W$ of the batch went up from 7,828 to 17,653 Daltons providing support to the hypothesis. In contrast, the batches in Example 1 and Comparative Example 4 do not show appreciable gain in $M_W$ upon additional phosgenation. This suggests that when ratio of PPPBP/phosgene (lb/lb) is lower than 1.75, for example below 1.7, the reaction is not driven to completion or may need phosgene well in excess of 40% to complete the batch and that the polymer chain is not suitably capped to become stable.

Comparative Example 6 (Use of Phase Transfer Catalyst)

An additional comparative example was run using the process conditions as in Example 1 above, except using a phase transfer catalyst. The total phosgene charged to the batch is 42% excess to the stoichiometry assuming no side reactions. The pH profile for the trials in Example 6 is in the range of 8 to 10. The catalyst package used for Comparative Example 6 contains of a combination of a phase transfer catalyst MTBA and a condensation catalyst, TEA. Both TEA and MTBA are in the range of 0.5 to 2 mol % of combined moles of the monomers BPA and PPPBP.

TABLE 3

Copolymer synthesis using a hybrid catalyst package

| Example | Reaction $M_W$ (Da) | PDI | $M_W$ <1000, wt % | mol % PPPBP in polymer |
|---|---|---|---|---|
| 6-1 | 22257 | 2.16 | 0.783 | 33.27 |
| 6-2 | 17919 | 2.10 | 0.829 | 33.11 |

Table 3 demonstrates that good quality $M_W$ buildup with low PDI was achieved with a hybrid catalyst package.

Samples were taken from the water side of the centrifuge train during these runs to quantify creaming. The feed rate

TABLE 2

Impact of PPPBP feed rate on polymer MW buildup

| Example | PPPBP/phosgene ratio, lb/lb dry basis | % phosgene total when PPPBP charge ends | Reaction Product Mw, Da | mol endcap/mol (PPPBP + BPA) | PDI | $M_w$ < 1000, wt % | mol % PPPBP units in polymer |
|---|---|---|---|---|---|---|---|
| 5-1 | 1.5 | =65% | 7828 | 4.2% | 1.92 | 2.68 | 31 |
| 5-2 | 1.7 | =55% | 15882 | 4.2% | 2.00 | 0.84 | 30.9 |
| 1 | 2.26 | 42% | 23140 | 4.2% | 2.17 | 0.69 | 31.6 |
| 4 | 9.5 | 10% | 25158 | 4.4% | 2.22 | 0.65 | 34.4 |

It is clear from the two trials conducted for Comparative Example 5 in Table 2 that $M_W$ buildup does not occur when PPPBP/Phosgene ratio is low, particularly below 2. The target endcap charged for all the four trial conditions shown in Table 2 is approximately same within the margin of error although it seems that experiment in Example 5 got more PPPBP solution charge and hence actual endcap/(BPA+ PPPBP), mol/mol might have been lower for Example 4 and hence higher molecular weight. Not wishing to be bound by of combined aqueous and organic streams is 4 grams per minute (gpm) and the target percent solids for the resin solution is 8% for the data tabulated in Table 4. TA-60 centrifuges from Westfalia are used to carry out brine and resin phase separation in centrifuge #1, TEA extraction from resin solution using low pH (<3) water in centrifuge #2 followed by multiple steps of water washing to remove ionic impurities in centrifuges #3,4. Ideally there would be no polymer solution in these samples, but the presence of either a distinct organic phase (also referred to as polymer phase) or an emulsified polymer/water phase represent creaming issues. The more organic phase (which comprises the polymer phase dissolved in the organic solvent) or emulsion that is found in the water phase, the more severe the creaming issue. The percentage was determined based upon the volume of each of the organic phase, emulsion, and aqueous phase based upon the following formula:

$$\text{creaming\%} = \frac{\text{volume organic phase} + \text{volume emulsion}}{\text{volume aqueous phase} + \text{volume organic phase} + \text{volume emulsion}} * 100.$$

TABLE 4

Comparative creaming for PPPBP/BPA copolymers synthesized by alternative routes

| | % Creaming | | | |
|---|---|---|---|---|
| | CFG[†] 1 water side | CFG 2 water side | CFG 3 water side | CFG 4 water side |
| Example 1 | 4 | 2 | 2 | 0 |
| Comparative Example 2 | 0 | 0 | 0 | 0 |
| Comparative Example 3 | 0 | 0 | 0 | 0 |
| Comparative Example 4 | 4 | 16 | 8 | 16 |
| Comparative Example 5 | No sample (Mw too low) | No sample (Mw too low) | No sample (Mw too low) | No sample (Mw too low) |
| Comparative Example 6 | 2 | 2 | 36 | 24 |

[†]"CFG" = centrifuge

The data from Table 4 shows that Comparative Example 4 and Comparative Example 6 gave unacceptably large amounts of creaming. Comparative Example 5 did not build enough molecular weight to isolate.

Polymer samples from these conditions were then tested for hydrolytic stability. A stock solution of anisole (450 g), MEK (300 g) and deionized water (2.5 g) was stirred until homogeneous. A polymer sample (2 g) was then dissolved in an aliquot (50 g) of anisole/MEK/H$_2$O solution. The polymer solution was then analyzed for M$_W$ by gel permeation chromatography ("GPC") and then heated at 60° C. for 48 hours. The M$_W$ was reanalyzed by GPC and the % M$_W$ retention calculated as 100*final M$_W$/initial M$_W$. Data is presented below:

TABLE 5

Comparative hydrolytic stability of PPPBP/BPA copolymers

| Polymer Sample | % M$_W$ retention after 48 hours at 60° C. |
|---|---|
| Example 1 | 94 |
| Comparative Example 2 | 86 |
| Comparative Example 3 | 83 |
| Comparative Example 4 | 83 |
| Comparative Example 5 | No sample |
| Comparative Example 6 | 85 |

The data from Table 5 shows that the method according to Example 1 gives a more hydrolytically stable polymer (e.g., greater than or equal to 90% retention of Mw after 48 hours at 60° C.) than other ways of preparing PPPBP/BPA copolymers.

The singular forms "a," "an," and "the" include plural referents unless the context clearly dictates otherwise. "Or" means "and/or" unless the context clearly dictates otherwise. The modifier "about" used in connection with a quantity is inclusive of the stated value and has the meaning dictated by the context (e.g., includes the degree of error associated with measurement of the particular quantity). The endpoints of all ranges directed to the same component or property are inclusive and independently combinable (e.g., ranges of "less than or equal to 25 wt %, or 5 wt % to 20 wt %," is inclusive of the endpoints and all intermediate values of the ranges of "5 wt % to 25 wt %," etc.). Disclosure of a narrower range or more specific group in addition to a broader range is not a disclaimer of the broader range or larger group. The suffix "(s)" is intended to include both the singular and the plural of the term that it modifies, thereby including at least one of that term (e.g., the colorant(s) includes at least one colorant). "Optional" or "optionally" means that the subsequently described event or circumstance can or cannot occur, and that the description includes instances where the event occurs and instances where it does not. Unless defined otherwise, technical and scientific terms used herein have the same meaning as is commonly understood by one of skill in the art to which this invention belongs. A "combination" is inclusive of blends, mixtures, alloys, reaction products, and the like.

As used herein, the term "hydrocarbyl" and "hydrocarbon" refers broadly to a substituent comprising carbon and hydrogen, optionally with 1 to 3 heteroatoms, for example, oxygen, nitrogen, halogen, silicon, sulfur, or a combination thereof; "alkyl" refers to a straight or branched chain, saturated monovalent hydrocarbon group; "alkylene" refers to a straight or branched chain, saturated, divalent hydrocarbon group; "alkylidene" refers to a straight or branched chain, saturated divalent hydrocarbon group, with both valences on a single common carbon atom; "alkenyl" refers to a straight or branched chain monovalent hydrocarbon group having at least two carbons joined by a carbon-carbon double bond; "cycloalkyl" refers to a non-aromatic monovalent monocyclic or multicyclic hydrocarbon group having at least three carbon atoms, "cycloalkenyl" refers to a non-aromatic cyclic divalent hydrocarbon group having at least three carbon atoms, with at least one degree of unsaturation; "aryl" refers to an aromatic monovalent group containing only carbon in the aromatic ring or rings; "arylene" refers to an aromatic divalent group containing only carbon in the aromatic ring or rings; "alkylaryl" refers to an aryl group that has been substituted with an alkyl group as defined above, with 4-methylphenyl being an exemplary alkylaryl group; "arylalkyl" refers to an alkyl group that has been substituted with an aryl group as defined above, with benzyl being an exemplary arylalkyl group; "acyl" refers to an alkyl group as defined above with the indicated number of carbon atoms attached through a carbonyl carbon bridge (—C(═O)—); "alkoxy" refers to an alkyl group as defined above with the indicated number of carbon atoms attached through an oxygen bridge (—O—); and "aryloxy" refers to an aryl group as defined above with the indicated number of carbon atoms attached through an oxygen bridge (—O—).

Unless otherwise indicated, each of the foregoing groups can be unsubstituted or substituted, provided that the substitution does not significantly adversely affect synthesis, stability, or use of the compound. The term "substituted" as used herein means that at least one hydrogen on the designated atom or group is replaced with another group, provided that the designated atom's normal valence is not exceeded. When the substituent is oxo (i.e., ═O), then two hydrogens on the atom are replaced. Combinations of substituents and/or variables are permissible provided that the substitutions do not significantly adversely affect synthesis or use of the compound. Exemplary groups that can be present on a "substituted" position include, but are not limited to, cyano; hydroxyl; nitro; azido; alkanoyl (such as a $C_{2-6}$ alkanoyl group such as acyl); carboxamido; $C_{1-6}$ or $C_{1-3}$ alkyl, cycloalkyl, alkenyl, and alkynyl (including groups having at least one unsaturated linkages and from 2 to 8, or 2 to 6 carbon atoms); $C_{1-6}$ or $C_{1-3}$ alkoxy; $C_{6-10}$ aryloxy such as phenoxy; $C_{1-6}$ alkylthio; $C_{1-6}$ or $C_{1-3}$ alkylsulfinyl; C1-6 or $C_{1-3}$ alkylsulfonyl; aminodi($C_{1-6}$ or $C_{1-3}$) alkyl; $C_{6-12}$ aryl having at least one aromatic rings (e.g., phenyl, biphenyl, naphthyl, or the like, each ring either substituted or unsubstituted aromatic); $C_{7-19}$ alkylenearyl having 1 to 3 separate or fused rings and from 6 to 18 ring carbon atoms, with benzyl being an exemplary arylalkyl; or arylalkoxy having 1 to 3 separate or fused rings and from 6 to 18 ring carbon atoms, with benzyloxy being an exemplary arylalkoxy.

All cited patents, patent applications, and other references are incorporated herein by reference in their entirety. However, if a term in the present application contradicts or conflicts with a term in the incorporated reference, the term from the present application takes precedence over the conflicting term from the incorporated reference.

While typical embodiments have been set forth for the purpose of illustration, the foregoing descriptions should not be deemed to be a limitation on the scope herein. Accordingly, various modifications, adaptations, and alternatives can occur to one skilled in the art without departing from the spirit and scope herein.

What is claimed is:

1. A method for preparing polycarbonate copolymer by an interfacial method, comprising
    phosgenating a mixture comprising an aromatic dihydroxy compound, water, an organic solvent substantially immiscible with water, and a condensation catalyst to form a reaction mixture;
    cofeeding an aqueous high heat comonomer feed to the reaction mixture during the phosgenation step, wherein during phosgenation, a ratio of high heat comonomer/phosgene weight/weight dry basis is about 1.75 to about 9; and
    maintaining the pH of the reaction mixture during the phosgenation step at greater than 7 to less than 11,
    to form a polycarbonate copolymer comprising greater than about 30 mole % structural units derived from the high heat comonomer.

2. The method of claim 1, wherein the aqueous high heat comonomer feed is a slurry feed, a solution feed, or a combination comprising at least one of the foregoing feeds.

3. The method of claim 1, wherein the ratio of high heat comonomer/phosgene is about 1.75 to about 6 weight/weight dry basis.

4. The method of claim 1, wherein the ratio of high heat comonomer/phosgene is about 1.75 to about 4 weight/weight dry basis.

5. The method of claim 1, wherein the pH of the reaction mixture during the phosgenation step is maintained at about 8 to about 10.

6. The method of claim 1, wherein the pH of the reaction mixture during the phosgenation step is maintained using a caustic.

7. The method of claim 1, wherein the pH of the reaction mixture during the phosgenation step is maintained using an alkali metal hydroxide, an alkaline earth hydroxide, or an alkaline earth oxide.

8. The method of claim 1, wherein the pH of the reaction mixture during the phosgenation step is maintained using aqueous sodium hydroxide.

9. The method of claim 1, wherein the aromatic dihydroxy compound is a compound according to Formula (3)

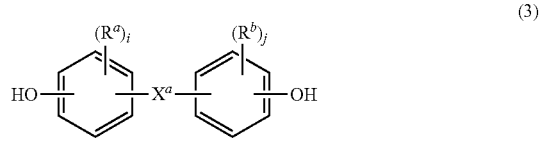

wherein $R^a$ and $R^b$ are each independently a halogen, $C_{1-12}$ alkoxy, or $C_{1-12}$ alkyl; i and j are each independently integers of 0 to 4; and $X^a$ is single bond, —O—, —S—, —S(O)—, —S(O)_2—, —C(O)—, or a $C_{1-18}$ organic group; or Formula (5)

wherein each $R^h$ is independently a halogen atom, a $C_{1-10}$ alkyl, a halogen-substituted $C_{1-10}$ alkyl, a $C_{6-10}$ aryl, or a halogen-substituted $C_{6-10}$ aryl; and h is 0 to 4.

10. The method of claim 1, wherein the aromatic dihydroxy compound is bisphenol A.

11. The method of claim 1, wherein the high heat comonomer is a compound according to Formula (1a), Formula (1b), or a combination comprising at least one of the foregoing:

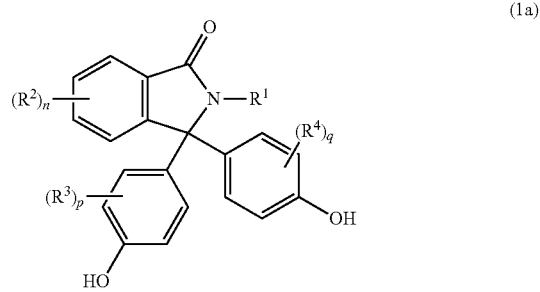

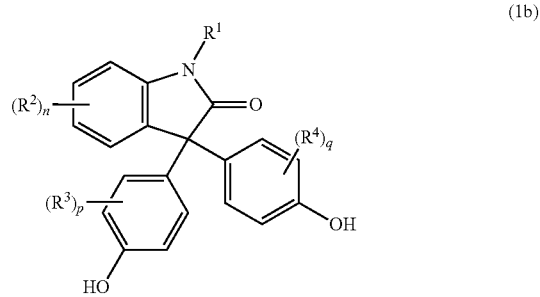

wherein $R^1$ is $C_{1-12}$ alkyl, $C_{6-12}$ aryl optionally substituted with 1 to 5 $C_{1-10}$ alkyl groups, or benzyl optionally substituted with 1 to 5 $C_{1-10}$ alkyl groups; $R^2$ is a $C_{1-12}$ hydrocarbyl group or a halogen; $R^3$ and $R^4$ are each independently a halogen, $C_{1-12}$ alkoxy, or $C_{1-12}$ alkyl; n is 0 to 2; and p and q are each independently 0 to 4.

12. The method of claim 1, wherein the high heat comonomer is 3,3-bis(4-hydroxyphenyl)-2-phenylisoindolin-1-one ("PPPBP").

13. The method of claim 1, wherein the condensation catalyst is an organic tertiary amine.

14. The method of claim 1, wherein the mixture further comprises a chelating agent.

15. The reaction of claim 1, performed in the absence of a phase transfer catalyst.

16. The method of claim 1, wherein the polycarbonate copolymer comprises about 30 to about 70 mole % structural units derived from the high heat comonomer.

17. The method of claim 1, wherein the polycarbonate copolymer is hydrolytically stable and has a glass transition temperature of about 180 to about 250° C.

18. The method of claim 1, wherein the polycarbonate copolymer retains greater than or equal to 90% of an initial Mw after 48 hours at 60° C. as determined using gel permeation chromatography.

19. The method of claim 1, wherein the polycarbonate copolymer has a low creaming on the centrifuges, wherein the creaming is less than 5% on each of the centrifuges, wherein the creaming percent is determined by the following formula:

$$\text{creaming\%} = \frac{\text{volume organic phase} + \text{volume emulsion}}{\text{volume aqueous phase} + \text{volume organic phase} + \text{volume emulsion}} * 100.$$

20. A method for preparing polycarbonate copolymer by an interfacial method, comprising
phosgenating a mixture comprising an aromatic dihydroxy compound, water, an organic solvent, and a condensation catalyst to form a reaction mixture, wherein organic solvent is selected from methylene chloride, 1,2-dichloroethane, chlorobenzene, and toluene;
cofeeding an aqueous high heat comonomer feed to the reaction mixture during the phosgenation step at a ratio of about 1.75 to about 9 high heat comonomer/phosgene weight/weight dry basis; and
maintaining the pH of the reaction mixture during the phosgenation step at greater than 7 to less than 11,
to form a polycarbonate copolymer comprising greater than about 30 mole % structural units derived from the high heat comonomer.

* * * * *